United States Patent
Dickeduisberg

[19]

[11] Patent Number: 6,094,879
[45] Date of Patent: Aug. 1, 2000

[54] CORNER CONNECTOR FOR L-SECTION FRAME ELEMENTS

[75] Inventor: Ingolf Dickeduisberg, Soest, Germany

[73] Assignee: Opus Patent- und Know How Verwertungsgesellschaft mbH, Berlin, Germany

[21] Appl. No.: 09/197,406

[22] Filed: Nov. 20, 1998

[30] Foreign Application Priority Data

Nov. 20, 1997 [DE] Germany ........................ 297 21 225 U

[51] Int. Cl.$^7$ ..................................................... E04B 1/02
[52] U.S. Cl. ........................ 52/656.9; 52/656.7; 403/231; 403/402
[58] Field of Search ..................... 52/656.9, 656.2–656.7, 52/281, 282, 282.2–282.4; 403/231, 401, 402; 160/105, 381

[56] References Cited

U.S. PATENT DOCUMENTS

| | | |
|---|---|---|
| 3,627,359 | 12/1971 | Paul . |
| 3,673,674 | 7/1972 | Catulle . |
| 3,709,533 | 1/1973 | Walters . |
| 3,797,194 | 3/1974 | Ekstein . |
| 3,848,390 | 11/1974 | Anderson et al. ...................... 52/656.9 |
| 3,866,380 | 2/1975 | Benson ............................... 52/656.9 X |
| 4,161,977 | 7/1979 | Baslow ............................... 403/231 X |
| 4,651,482 | 3/1987 | Borys ................................. 52/656.9 X |
| 5,048,997 | 9/1991 | Peterson ............................. 52/656.9 X |
| 5,076,736 | 12/1991 | Grewe et al. ....................... 403/402 X |
| 5,433,054 | 7/1995 | Langenhorst . |
| 5,473,853 | 12/1995 | Guillemet et al. ................. 52/656.9 X |

FOREIGN PATENT DOCUMENTS

| | | |
|---|---|---|
| 629994 | 5/1991 | Australia . |
| 602285 | 7/1960 | Canada ................................ 403/402 |
| 2240373 | 3/1975 | France . |
| 1937380 | 10/1970 | Germany . |
| 2515924 | 10/1976 | Germany . |
| 2757886 | 6/1979 | Germany . |
| 3023960 | 1/1981 | Germany . |
| 651672 | 4/1951 | United Kingdom . |
| 2041057 | 9/1980 | United Kingdom . |
| 2085108 | 4/1982 | United Kingdom . |

Primary Examiner—Richard Chilcot
Attorney, Agent, or Firm—Herbert Dubno

[57] ABSTRACT

A pair of L-section elements extend generally perpendicular to each other and each have a pair of legs one of which is provided with a mounting formation and the other of which is generally coplanar with the other leg of the other element. The corner connector has a body adapted to fit between and abut ends of the one pair of legs of the elements and a pair of retaining arms extending from the body and resiliently engaging the respective mounting formations. Each body is comprised of an outer part of a width substantially the same as a width of the one legs and an inner part behind the outer part and from which the retaining arms extend.

8 Claims, 2 Drawing Sheets

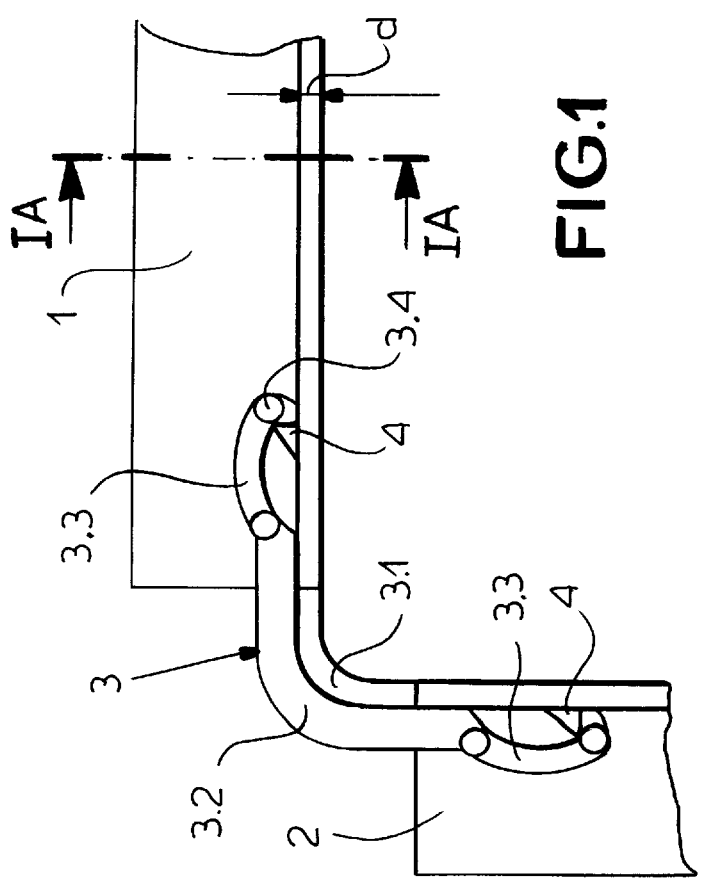
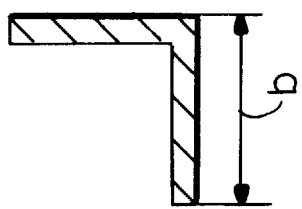
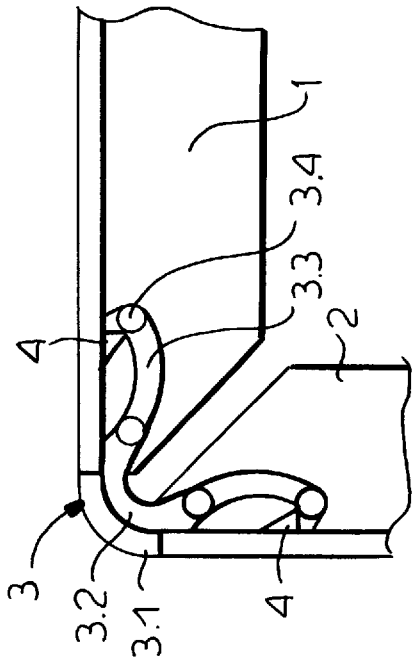

CORNER CONNECTOR FOR L-SECTION FRAME ELEMENTS

FIELD OF THE INVENTION

The present invention relates to a corner connector for L-section frame elements. More particularly this invention concerns such a connector used in making a frame for an inspection or access opening or a door therefor.

BACKGROUND OF THE INVENTION

U.S. Pat. No. 5,433,054 describes an inner frame for a cover and an outer frame for an inspection opening formed with frame elements having flanges projecting from the plane of the frame and formed with tongues at their ends engageable by resilient hooks of the respective corner elements which fit without play against the frame elements. The frame ends are cut at right angles to the longitudinal edges of the frame element in the case of the outer frame and are provided with abutting miters in the case of the inner frame.

The essential disadvantage of this corner connection is that the dimensional stability of the corners depends both on the accurate manufacture of the corner-piece/catch-tongue pairing and on the exact abutment of adjacent frame elements. This necessitates high manufacturing accuracies during the production of the corner connectors and the production of the frame elements.

OBJECTS OF THE INVENTION

It is therefore an object of the present invention to provide an improved corner connector for L-section frame elements.

Another object is the provision of such an improved corner connector for L-section frame elements which overcomes the above-given disadvantages, that wherein the dimensional stability of the corners of the frames is determined solely by the corner connectors.

SUMMARY OF THE INVENTION

These objects are attained by a connector used in combination with a pair of L-section elements extending generally perpendicular to each other and each having a pair of legs one of which is provided with a mounting formation and the other of which is generally coplanar with the other leg of the other element. The corner connector has,,according to the invention a body adapted to fit between and abut ends of the one legs of the elements and a pair of retaining arms extending from the body and resiliently engaging the respective mounting formations. Each body is comprised of an outer part of a width substantially the same as a width of the one legs and an inner part behind the outer part and from which the retaining arms extend.

With this type of corner connector the ends of the frame elements do not actually contact each other, but instead are held apart by the corner connector. Thus the corner connector is pushed or pulled into the open corner or, in other words, the frame elements are in each case pushed or pulled into the recess of the corner connector. This allows relatively wide manufacturing tolerances during the production and assembly of the frame elements, without the dimensional stability of the corner connection being impaired.

The mounting formations in accordance with the invention are barbs projecting from the one legs. These barbs can be pressed out of the one legs in a simple cold-forming operation. Manufacturing tolerances are compensated for by the resilient retaining arms which during assembly engage under stress behind the protruding formations. The intended non-positive connection is made easily, and the corner connector as a whole can be assembled easily.

The outer part has a width substantially less than a width of the one legs and is provided with projecting studs forming a width equal to the width of the one legs. These studs may also be formed right on-the retaining arms.

In a preferred embodiment the parts are both arcuate, preferably quarter-cylindrically tubular. They thus form a smooth corner between the adjacent frame elements.

Alternately the parts are of L-shape. It is even possible for the outer part to have a thickness different from a thickness of the one legs to achieve an attractive design effect.

According to another feature of the invention the inner parts are only formed in rear edge regions of the corner connector.

BRIEF DESCRIPTION OF THE DRAWING

The above and other objects, features, and advantages will become more readily apparent from the following description, reference being made to the accompanying drawing in which:

FIG. 1 is a side view of a corner-connector assembly for a wall, floor, r ceiling frame according to the invention;

FIG. 1A is a section taken along line IA—IA of FIG. 1;

FIG. 2 is a side view of a corner-connecting assembly for a cover frame; and

SPECIFIC DESCRIPTION

Figure 3A:
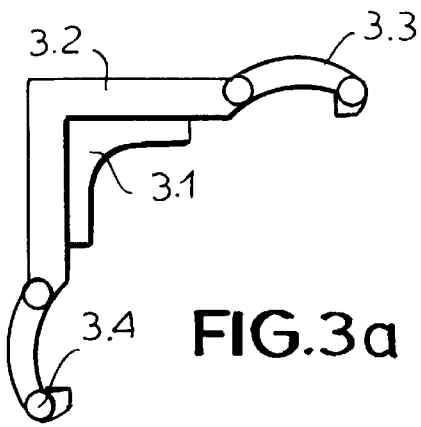
FIGS. 3a through 3f views of further corner connectors in accordance with the invention.

As seen in FIG. 1 and 2, adjacent L-shaped frame elements 1 and 2 set at a spacing from one another are connected to one another by means of-a corner connector 3 which fills the space between the adjacent L-shaped frame elements 1 and 2 and makes a non-positive connection with fastening points or barbs 4 of the adjacent L-shaped frame elements 1 and 2. The corner connector 3 consists here of two connected parts 3.1 and 3.2 that are,curved. Resilient elastic retaining arms 3.3 are unitarily formed on the corner connector part 3.2 on both sides and are connected non-positively to the fastening points 4 of adjacent L-shaped frame elements 1 and 2. In FIGS. 1 and 2 the retaining arms 3.3 engage under stress behind the barbs or protuberances 4 of the frame elements 1 and 2.

The corner connector parts 3.1 and 3.2 and the retaining arms 3.3 are preferably made from plastic and manufactured in one piece.

The corner connector part 3.1 is in the form of a quarter-cylindrical tube and connects the two L-legs of the adjacent L-shaped frame elements 1 and 2 that are perpendicular to the wall or ceiling plane. The part 31 has the same thickness d as the legs of the element 1 and 2 and the same width b (FIG. 1A) as these legs. The associated other corner connector part 3.2 supports these L-legs on the side which is not visible in the assembled state.

The two corner connector parts 3.1 and 3.2 of the corner connector 3 thus form a recess providing an exact fit for the respective ends of the L-legs of the adjacent L-shaped frame elements 1 and 2, the legs being perpendicular to the wall, floor or ceiling plane. Since the height of the corner connector part 3.1 corresponds to the width b of the L-leg, the corner is closed flush.

It is advantageous for assembly if the height of the corner connector parts 3.2 and the heights of the resilient elastic retaining arms 3.3 arranged on both sides are in each case smaller than the width b of the L-legs of the adjacent L-shaped frame elements 1 and 2. The difference is compensated for by studs 3.4 formed at the top and bottom on the corner connector part 3.2 and/or the retaining arms 3.3.

Figure 3D:
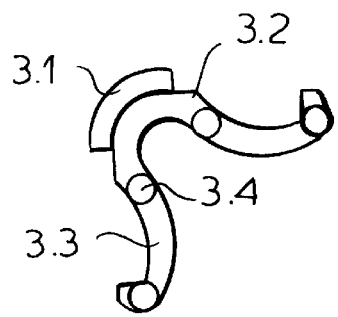
Figure 3B:
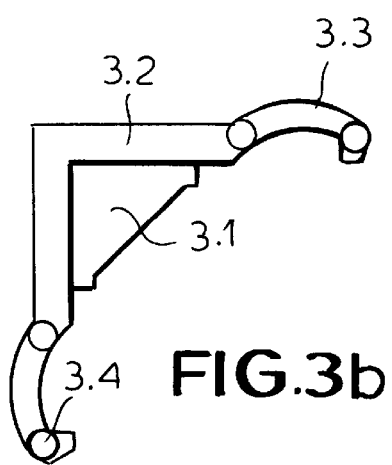
Figure 3E:
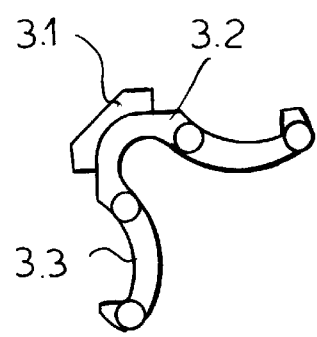
Figure 3C:
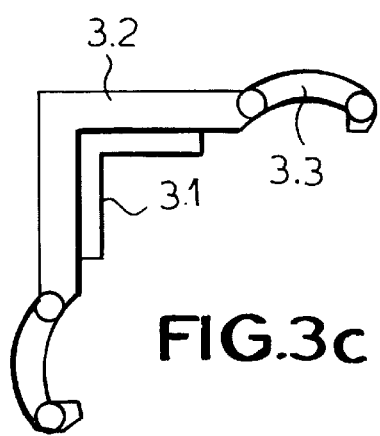
Figure 3F:
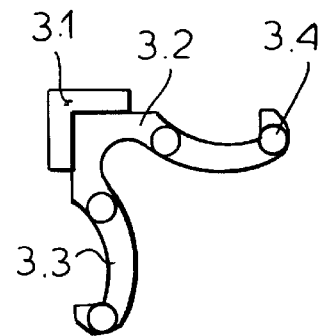

FIGS. 3*a* through 3*f* show further design variants of the corner connector 3, in each case for wall, floor and ceiling frames (FIGS. 3*a*—3*c*) and for cover frames (FIGS. 3*d*—3*f*). In each of these corner connectors 3,.the combination of the corner connector parts forms, in the edge region, a recess for receiving the respective frame-element end. In FIGS. 3*a* and 3*b*, outside the region of contact with the L-legs of adjacent L-shaped frame elements 1 and 2, the legs are perpendicular to the wall, floor or ceiling plane, the corner connector parts 3.1 have a thickness which differs from the thickness d of the L-legs.

I claim:

1. In combination with a pair of L-section elements extending generally perpendicular to each other, each having a pair of legs one of which is provided with a mounting formation and the other of which is generally coplanar with the other leg of the other element, a corner connector comprising:

a body having an outer part between and abutting ends of the one legs of the elements and of a width substantially the same as a width of the one legs and an inner part behind the outer part and unitary therewith; and a pair of retaining arms extending from the inner parts of the body and resiliently engaging past the respective mounting formations and pulling the elements into engagement with the body but out of contact with each other.

2. The combination defined in claim 1 wherein the mounting formations are barbs projecting from the one legs.

3. In combination with a pair of L-section elements extending generally perpendicular to each other, each having a lair of legs one of which is provided with a mounting formation and the other of which is generally coplanar with the other leg of the other element, a corner connector comprising:

a body between and abutting ends of the one legs of the elements and comprised of an outer part of a width substantially the same as a width of the one legs and an inner part behind the outer part, the outer part having a width substantially less than a width of the one legs and being provided with projecting studs forming a width equal to the width of the one legs; and respective retaining arms extending from the inner part of the body and each resiliently engaging a respective one of the mounting formations.

4. The combination defined in claim 1 wherein the parts are both arcuate.

5. In combination with a pair of L-section elements extending generally perpendicular to each other, each having a pair of legs one of which is provided with a mounting formation and the other of which is generally coplanar with the other leg of the other element, a corner connector comprising:

a body between and abutting ends of the one legs of the elements and comprised of an outer part of a width substantially the same as a width of the one legs and an inner part behind the outer part, the parts being arcuate and quarter-cylindrically tubular; and respective retaining arms extending from the inner part of the body and each resiliently engaging a respective one of the mounting formations.

6. The combination defined in claim 1 wherein the parts are of L-shape.

7. The combination defined in claim 1 wherein the outer part has a thickness different from a thickness of the one legs.

8. The combination defined in claim 1 wherein the inner parts are only formed in rear edge regions of the corner connector.

* * * * *